United States Patent [19]

Kondo et al.

[11] Patent Number: 5,100,926

[45] Date of Patent: Mar. 31, 1992

[54] PROCESS FOR PRODUCING POLYURETHANE

[75] Inventors: Kanemitu Kondo, Okazaki; Takao Nomura; Junzo Ukai, both of Toyota; Takuji Isaka, Kyoto; Isao Ishikawa, Kyoto; Kouzaburo Nagata, Kyoto, all of Japan

[73] Assignees: Toyota Jidosha Kabushiki Kaisha; Sanyo Chemical Industries, Inc., Japan

[21] Appl. No.: 380,798

[22] Filed: Jul. 17, 1989

[30] Foreign Application Priority Data

Jul. 18, 1988 [JP] Japan .................. 63-178599

[51] Int. Cl.$^5$ .............. C08G 18/14; C08G 18/08; C08G 18/32; C08J 9/14
[52] U.S. Cl. ................ 521/163; 521/137; 521/914; 528/44; 528/53; 528/55; 528/59; 528/61; 528/73; 528/75; 524/186
[58] Field of Search ............ 521/163, 55, 58, 160, 521/161, 137, 914; 528/76, 54, 44, 53, 59, 61, 73, 75, 55, 914; 264/51, 328.1, 328.6, 328.8; 524/186

[56] References Cited

U.S. PATENT DOCUMENTS

| | | | |
|---|---|---|---|
| 3,265,641 | 8/1966 | Foote et al. | 521/171 |
| 3,644,235 | 2/1972 | Gray | 521/163 |
| 4,299,924 | 11/1981 | Nomura et al. | 521/131 |
| 4,442,280 | 4/1984 | Grögler et al. | 528/54 |
| 4,519,965 | 5/1985 | Taylor et al. | 528/55 |
| 4,546,165 | 10/1985 | Grögler et al. | 528/53 |
| 4,636,531 | 1/1987 | Schmidt et al. | 521/163 |
| 4,663,415 | 5/1987 | Grögler et al. | 528/61 |
| 4,698,371 | 10/1987 | Werner et al. | 521/131 |
| 4,820,743 | 4/1989 | Ishikawa et al. | 521/137 |
| 4,837,245 | 6/1989 | Streu et al. | 528/58 |

Primary Examiner—John Kight, III
Assistant Examiner—Duc Truong
Attorney, Agent, or Firm—Finnegan, Henderson, Farabow, Garrett and Dunner

[57] ABSTRACT

Disclosed herein is a process for producing polyurethane moldings having good physical properties and good receptivity of electrostatic coating, said process comprising reacting a polyoxyethylene chain-containing polyether polyol having 2-4 hydroxyl groups and a hydroxyl equivalent higher than 750 as the high-molecular weight polyol, diaminotoluene and a low-molecular weight polyol having a hydroxyl equivalent of 30-100 as the low-molecular weight, active hydrogen-containing compound, with organic polyisocyanates in specific equivalent ratios respectively. The process may advantageously applied to injection reaction molding.

10 Claims, No Drawings

PROCESS FOR PRODUCING POLYURETHANE

BACKGROUND OF THE INVENTION

1. Field of the Invention

The present invention relates to a process for producing polyurethane, and more particularly, to a process for producing polyurethane suitable for molding by reaction injection molding process (abbreviated as RIM process hereinafter).

2. Description of the Prior Art

RIM process has been in practical use for the production of polyurethane moldings to be applied to automotive exterior and interior members such as bumpers, instrument panels, and steering wheels. It is known that the RIM process employs a polyol component which is a polyether polyol having a molecular weight of 1,500 to 12,000 and a chain extender which is a mixture composed of 5–45 wt % of aromatic diamine and 55–95 wt % of low-molecular weight diol. (See Japanese Patent Laid-open No. 74325/1982.)

The conventional polyurethane production process employs a gas loading device to ensure the mold filling of the reaction mix. On the other hand, there is a demand in the polyurethane industry that polyurethane with good moldability be produced by using the existing metering pump of axial plunger type. Unfortunately, the metering pump of axial plunger type has such a small delivery that it cannot be run with a large amount of gas loading required for the complete mold filling.

An aromatic diamine as the chain extender has a disadvantage that it, when used in excess of a certain amount, prevents the molding from electrostatic coating (which is a common finishing process). Thus there is a strong demand for a process for producing polyurethane which is superior in moldability and physical properties and receptive of electrostatic coating.

It is an object of the present invention to provide a process for producing polyurethane moldings with good moldability by using a metering pump which has such a low delivery that it does not permit a large amount of gas loading.

It is another object of the present invention to provide a process for producing polyurethane, said process permitting reducing the frequency of the application of external mold release agents.

It is further another object of the present invention to provide a process for producing polyurethane which is receptive of efficient electrostatic coating.

Other and further objects, features, and advantages of the present invention will appear more fully from the following description and claims.

SUMMARY OF THE INVENTION

In order to address the above-mentioned problems associated with the conventional technology, the present inventors carried out a series of researches, which led to the finding that polyurethane moldings with good moldability and physical properties and receptivity of electrostatic coating can be produced by using a low-delivery metering pump of axial plunger type if the chain extender is a low-molecular weight, active hydrogen-containing compound (composed of diaminotoluene and a low-molecular weight polyol in a specific ratio). The present invention was completed on the basis of this finding.

Accordingly, the gist of the present invention resides in a process for producing polyurethane by reacting an organic polyisocyanate, high-molecular weight polyol, and low-molecular weight, active hydrogen-containing compound with one another in the presence of catalysts and, if necessary, blowing agents, foam stabilizers, and other adjuvants, said process comprising using a polyoxyethylene chain-containing polyether polyol having 2–4 hydroxyl groups and a hydroxyl equivalent higher than 750 [component (a)] as the high-molecular weight polyol, diaminotoluene [component (b)] and a low-molecular weight polyol having a hydroxyl equivalent of 30–100 [component (c)] as the low-molecular weight, active hydrogen-containing compound, with the equivalent ratio of component (c) to component (a) being 8–12 and the equivalent ratio of component (b) to component (a) being 0.15–1.0.

In this specification, the term "hydroxyl equivalent" means the amount of the polyol equivalent to one hydroxyl group.

The polyether poly-ol [component (a)] used in the present invention includes those compounds and mixtures thereof which are formed by adding ethylene oxide and other alkylene- oxides to a compound having 2–4 (preferably 2–3) active hydrogen atoms (such as polyhydric alcohols, polyhydric phenols, and amines).

Examples of the polyhydric alcohols include dihydric alcohols such as ethylene glycol, diethylene glycol, propylene glycol, 1,3- and 1,4-butanediol, 1,6-hexanediol, neopentyl glycol and like alkylene glycols, and diols having a cyclic group (as disclosed in Japanese Patent Publication No. 1474/1970); trihydric alcohols such as glycerin, trimethylolpropane, trimethylolethane, hexanetriol, and triethanolamine; tetrahydric alcohols such as pentaerythritol, methyl glycoside, and diglycerin; and tetrakis-(hydroxymethyl)-cyclohexanol.

Examples of the polyhydric phenol include monocyclic polyhydric phenols such as pyrogallol, hydroquinone, and phloroglucinol; bisphenols such as bisphenol A and bisphenol sulfone; and phenol-formaldehyde condensate (novolak) such as polyphenol as disclosed in U.S. Pat. No. 3,265,641.

Examples of the amines include ammonia; alkanolamines such as mono-, di-, triethanolamine, isopropanolamine, and aminoethylethanolamine; $C_1$–$C_{20}$ alkylamines; aliphatic amines such as ethylene diamine, propylene diamine, hexamethylene diamine, and other alkylene diamines; aromatic amines such as aniline, phenylenediamine, diaminotoluene, xylylenediamine, methylenedianiline, diphenyletherdiamine, and other aromatic amines; alicyclic amines such as isophoronediamine, cyclohexylenediamine, and dicyclohexylmethanediamine; and aminoethylpiperazine and heterocyclic amines as disclosed in Japanese Patent Publication No. 21044/1980.

The active hydrogen-containing compounds mentioned above may be used alone or in combination with one another. Preferable among them are dihydric to tetrahydric alcohols, particularly dihydric and trihydric alcohols.

Examples of the alkylene oxide to be added to the above-mentioned active hydrogen-containing compound include ethylene oxide (abbreviated as EO hereinafter), propylene oxide (abbreviated as PO hereinafter), 1,2-, 1,3-, 1,4-, and 2,3-butylene oxide, and styrene oxide. They may be used in combination (for block and/or random addition).

Preferable among the polyols [component (a)] is one which has polyoxyethylene chains composed of EO and other alkylene oxide (abbreviated as AO hereinafter) [especially PO in combination with a small amount (say, less than 5%) of other AO such as butylene oxide and styrene oxide]. The content of the polyoxyethylene chains (abbreviated as EO content) should usually be higher than 5% (by weight), preferably 7–50%, and more preferably 10–40%. With the EO content less than 5%, the polyol has such low reactivity that it cures slow and provides poor initial physical properties. In addition, the polyol has such poor compatibility with isocyanate (with which it reacts) that it does not provide the homogenous reaction system. This leads to unsatisfactory molding, particularly in the case of RIM. Conversely, with the EO content in excess of 50%, the polyol has improved curability but is too viscous to handle easily. In addition, the polyol is poor in physical properties such as temperature characteristics and water absorption. Any polyol having an EO content lower than 5% may be used in combination with any polyol having an EO content higher than 5%, or any polyol having an EO content higher than 50% may be used in combination with any polyol having an EO content lower than 50%, so that the resulting polyol mixture has an average EO content which is within the above-mentioned range.

Examples of the above-mentioned polyol having polyoxyethylene chains include the following random/block adducts formed by adding EO and AO to the above-mentioned active hydrogen-containing compound. The addition may be block addition in the sequence of (1) AO-EO (tipped), (2) AO-EO-AO-EO (balanced), (3) EO-AO-EO, and (4) AO-EO-AO (active secondary), and random addition of (5) a mixture of EO and AO, (6) in the sequence as disclosed in Japanese Patent Publication No. 209920/1982, and (7) in the sequence as disclosed in Japanese Patent Publication No. 13700/1978.

Preferable among them are those which have terminal polyoxyethylene chains, particularly those corresponding to (1) and (2) above. The content of terminal EO should be 5% and above, preferably 7% and above, and more preferably 7–30%. The content of internal EO should usually be lower than 50%, preferably 10–40%.

The content of hydroxyl groups in the polyol [component (a)] should usually be 20% and above, preferably 30% and above, more preferably 50% and above, and most preferably 70% and above.

The hydroxyl equivalent of the polyether polyol [component (a)] should be 750 and above, preferably 1,500–3,000. With a hydroxyl equivalent higher than 3,000, the polyether polyol provides polyurethane which is poor in moldability (curability). With a hydroxyl equivalent lower than 750, the polyether polyol provides polyurethane which has a low elongation at low temperatures. The polyether polyol [component (a)] should usually have a molecular weight of 2,000–9,000, preferably 3,000–8,000.

To practice the process for producing polyurethane according to the present invention, the polyether polyol [component (a)] may be used in combination with other high-molecular weight polyols according to need. Examples of such high-molecular weight polyols include polyether polyols other than mentioned above, polyester polyols, and polymer polyols. Examples of the polyether polyols other than mentioned above include polyoxyethylene chain-containing polyether polyols having a molecular weight lower than 2,000 or higher than 12,000 which are obtained by adding alkylene oxides to an active hydrogen-containing compound (such as polyhydric alcohols) and polyoxyethylene chain-free polyether polyol. Examples of the polyester polyol include those which are obtained by reacting (condensing) the above-mentioned polyhydric alcohol (i.e., a dihydric alcohol such as ethylene glycol, diethylene glycol, propylene glycol, 1,3- or 1,4-butanediol, 1,6-hexanediol, and neopentyl glycol, or a mixture thereof with a trihydric or higher alcohol such as glycerin and trimethylolpropane) and/or polyether polyol (one containing 5% or above of EO and/or one containing less than 5% of EO) with a polycarboxylic acid or an anhydride thereof or lower ester thereof (ester-forming derivative) (such as adipic acid, sebacic acid, maleic anhydride, phthalic anhydride, dimethyl terephthalate) and alkylene oxide (such as EO and PO); and those which are obtained by the ring-opening polymerization of lactone ($\epsilon$-caprolactam. Examples of the polymer polyol include the polyol which is obtained by polymerizing these polyols (polyether polyol and/or polyester polyol) with an ethylenically unsaturated monomer, as disclosed in Japanese Patent Laid-open Nos. 101899/1979 and 122396/1979. Additional polyols that can be used in the present invention include polybutadiene polyol, hydroxyl group-containing vinyl polymer (acrylic polyol), those which are disclosed in Japanese Patent Laid-open Nos. 57413/1983 and 57414/1983, natural oil-based polyol such as castor oil, and modified polyols.

The amount of EO in the high-molecular weight polyols as a whole should usually be 5% and above, preferably 7–50%, and more preferably 10–40%. The amount of terminal EO should usually be 5% and above, preferably 7–30%. The amount of internal EO should usually be 5–50%, preferably 10–40%. The average number of functional groups in the high-molecular weight polyols as a whole should usually be 2–4, preferably 2.1–3. The average hydroxyl number of the high-molecular weight polyols as a whole should usually be 18–40, preferably 20–30.

The aromatic polyamine [component (b)], which is used as a portion of the low-molecular weight, active hydrogen-containing compound (chain extender and/or crosslinker) is an 80/20 (by weight) mixture of 2,4-diaminotoluene and 2,6-diaminotoluene. They are unsubstituted aromatic amines and available at a lower price than alkyl-substituted aromatic amine such as diethyltolylenediamine. Being capable of providing polyurethane which is inexpensive and yet of high quality, they are vary advantageous to the polyurethane industry and polyurethane users.

The diaminotoluene should be used in an amount of 0.15–1.0 equivalent, preferably 0.2–0.8 equivalent, and more preferably 0.25–0.7 equivalent for the high-molecular weight polyol. If the diaminotoluene is used in an amount more than specified above, the polyol components (i.e., the high-molecular weight polyol and low-molecular weight polyol, and adjuvants thereof) as a whole are so active that the reaction mix does not flow well and fill the mold completely. This is a drawback particularly in the case where the RIM equipment is provided with a metering pump of axial plunger type which has a low delivery and limited in the amount of gas loading. In addition, the diaminotoluene used in an excess amount provides polyurethane moldings which have such a high volume resistance that they cannot be finished well by electrostatic coating under normal conditions. If the aromatic polyamine is used in an amount less than specified above, the reaction mix has good fluidity but is slow to become viscous. As the result, the reaction mix is liable to entrap air during injection and cause voids in the moldings. An additional disadvantage is that the resulting moldings do not have a good skin, which makes it necessary to use a large amount of external release agent for demolding.

The low-molecular weight polyol [component (c)] to be used in combination with the aromatic polyamine [component (b)] is a low-molecular weight polyol having at least 2 hydroxyl groups (preferably 2-3 hydroxyl groups and most desirably 2 hydroxyl groups), with the hydroxyl equivalent being 30-100, preferably 30-50. The low-molecular weight polyol includes low-molecular weight diols and tri- and higher hydric low-molecular weight polyols. Examples of the former include ethylene glycol, diethylene glycol, propylene glycol, dipropylene glycol, 1,4-butanediol, neopentyl glycol, hexane diol, polyethylene glycol having a molecular weight of 200, polypropylene glycol, low-molecular weight diols having cyclic groups (such as propylene oxide adducts of bisphenol A as disclosed in Japanese Patent Publication No. 1474/1970), low-molecular weight diols having a tertiary or quaternary nitrogen atom (such as alkyldialkanolamine and quaternary products thereof, as disclosed in Japanese Patent Laid-open No. 130699/1979), low-molecular weight diols such as thiodiethyleneglycol; and examples of the latter include glycerin and trimethylolpropane. The former and the latter may be used in combination at a ratio of 100:0 to 50:50. Preferably among them are low-molecular weight polyols (especially diols), typical examples thereof being ethylene glycol, 1,4-butanediol, neopentyl glycol, and 1,6-hexanediol, and mixtures thereof.

The aromatic polyamine [component (b)] and the low-molecular weight polyol [component (c)] may be used in combination with other low-molecular weight, active hydrogen containing compounds, according to need. Examples of such compounds include amino alcohol (alkanolamine such as monoethanolamine and monopropanolamine); aliphatic, alicyclic, and heterocyclic polyamines (such as those which have been listed as the raw materials of component (a)); and hydrazine. They may be used in an amount less than 10 wt % of the total amount of the low-molecular weight, active hydrogen-containing compounds [components (a) and (b) and, if necessary, other low-molecular weight, active hydrogen-containing compounds].

The low-molecular weight, active hydrogen-containing compounds [components (a) and (b) and other low-molecular weight, active hydrogen-containing compounds which are used according to need] should usually be used in an amount of 8-13 equivalents, preferably 9-12 equivalents, for 1 equivalent of the high-molecular weight polyol. If they are used in excess of the upper limits specified, the polyol component has relatively low reactivity, which makes it necessary to add more catalysts, and in turn, impairs the fluidity of the reaction mix. If they are used in an amount less than specified, the resulting moldings have poor characteristic properties, especially low flexural modulus and high heat sag.

The organic polyisocyanate used in the present invention is one which has been in use for polyurethane production. Examples of the polyisocyanate include aromatic polyisocyanates having 6-20 carbon atoms (excluding carbon atoms in the NCO group), aliphatic polyisocyanates having 2-18 carbon atoms, alicyclic polyisocyanates having 4-15 carbon atoms, aromatic polyisocyanate having 8-15 carbon atoms, and modified products thereof (such as those containing urethane groups, carbodiimide groups, allophanate groups, urea groups, biuret groups, uretdione groups, uretimine groups, isocyanulate groups, and oxazolidone groups). Typical examples of the polyisocyanate include 1,3- and 1,4-phenylene diisocyanate, 2,4- and/or 2,6-tolylene diisocyanate (TDI), crude TDI, diphenylmethane-2,4- and/or 4,4-diisocyanate (MDI), crude MDI (phosgenated product of crude diaminodiphenylmethane [a condensation product of formaldehyde and aromatic amine (aniline) or a mixture thereof: a mixture of diaminodiphenylmethane and a small amount (say, 5-20 wt %) of tri- or higher functional polyamine: and polyaryl polyisocyanate (PAPI)}; aromatic polyisocyanate such as naphthylene-1,5-diisocyanate, triphenylmethane-4,4,4"-triisocyanate, and m- and p-isocyanate phenylsulfonyl isocyanate; aliphatic polyisocyanate such as ethylene diisocyanate, tetramethylene diisocyanate, hexamethylene diisocyanate, 1,6,11-undecane triisocyanate, 2,2,4-trimethylhexane diisocyanate, lysine diisocyanate, 2,6-diisocyanate methylcaproate, bis(2-isocyanate ethyl) fumarate, bis(2-isocyanate ethyl) carbonate, and 2-isocyanate ethyl-2,6-diisocyanate hexanoate; alicyclic polyisocyanate such as isophorone diisocyanate, dicyclohexylmethane diisocyanate (hydrogenated MDI), cyclohexylene diisocyanate, methylcyclohexylene diisocyanate (hydrogenated TDI), and bis(2-isocyanate ethyl) 4-cyclohexene-1,2-dicarboxylate; aromatic-aliphatic polyisocyanate such as xylylene diisocyanate and diethylbenzene diisocyanate; modified MDI (such as urethane-modified MDI, carbodimide-modified MDI, and trihydrocarbyl phosphate-modified MDI); and polyisocyanate modified product (such as urethane-modified TDI). They may be used in combination with one another [e.g., modified MDI in combination with urethane-modified TDI (isocyanate-containing prepolymer)].

The urethane-modified polyisocyanate or free isocyanate-containing prepolymer is prepared by reacting excess polyisocyanate (TDI, MDI, etc.) with a polyol. This polyol is a polyol having a hydroxyl equivalent of 30-200. Examples of the polyol include glycols such as ethylene glycol, propylene glycol, diethylene glycol, and dipropylene glycol; triols such as trimethylol propane and glycerin; high functional polyols such as pentaerythritol and sorbitol; and their alkylene oxide (ethylene oxide and/or propylene oxide) adducts. Preferable among them are those which have two to three functional groups. The above-mentioned modified polyisocyanate and prepolymer should usually have an isocyanate equivalent of 130-200, preferably 145-200, and more preferably 160-180. Preferable among them are aromatic diisocyanates, and particularly preferable among them are 2,4-TDI and 2,6-TDI and a mixture of these isomers; crude TDI; 4,4-MDI and 2,4-MDI and a mixture of these isomers; PAPI (which is also called crude MDI); modified polyisocyanates derived from these polyisocyanates which contain urethane groups, carbodiimide groups, allophanate groups, urea groups, biuret groups, and isocyanurate groups. Most desirable among them are modified MDI [such as "Coronate" C-1059 and C-1050 (made by Nippon Polyurethane Co., Ltd.), "Isonate" 160L and 181 (made by Kasei Upjohn Co., Ltd.), "Sumidur" PC and PF (made by Sumitomo Bayer Urethane Co., Ltd.)].

According to the present invention, the isocyanate index for polyurethane molding should usually be 80-120, preferably 85-110, and most desirably 95-108. (The isocyanate index is defined by [NCO÷equivalent of active hydrogen-containing groups×100], where the active hydrogen-containing groups include hydroxyl groups and amino groups but exclude carboxyl groups. It is also possible to introduce polyisocyanurate into polyurethane, in which case the isocyanate index may be much higher (say, 300-1,000 or even above) than the above-mentioned upper limit.

The process of the present invention for producing polyurethane from a high-molecular weight polyol and a low-molecular weight, active hydrogen-containing compound may or may not involve foaming. In the former case, polyurethane foam is produced, and in the latter case, polyurethane resin (elastomer or sheet) is produced.

Foaming should be performed such that the resulting polyurethane foam has a density of 0.3 g/cm$^3$ and above, preferably 0.6 g/cm$^3$ and above, and most desirably 0.8 g/cm$^3$ and above. Foaming may be accomplished by using water and/or a volatile blowing agent or by introducing a gas (e.g., air) at the time of molding. (The latter method is referred to as air loading.)

Examples of the volatile blowing agent that can be used for the foaming process include halogen-substituted aliphatic hydrocarbon blowing agents such as trichloromonofluoromethane known as "Flon". The amount of water should usually be less than 0.4%, preferably less than 0.2%, of the amount of the high-molecular weight polyol. With an amount in excess of 0.4%, water gives off excess carbon dioxide gas during reaction which forms bubbles in the surface layer of the molding, impairing the appearance of the molding. In addition, excess water increases the number of low-molecular weight urea linkages, giving rise to the molding having a high hardness, which is brittle at low temperatures. The amount of the halogen-substituted hydrocarbon blowing agent should be less than 30%, preferably 2-20%, of the total amount of the resin raw materials (organic polyisocyanate, high-molecular weight polyol, chain extender, and crosslinker), if it is not used in combination with water. However, the amount should be less than 20%, preferably 0-1.5%, of the total amount of the resin raw materials, if it is used in combination with water in an amount of 0.4% of the high-molecular weight polyol. In the case where air loading is performed on equipment which permits an increased amount of gas loading, it is desirable to introduce as much gas as required to reduce the density of resin raw materials by 5-40%.

According to the present invention, the reaction may be accelerated by using catalysts which are commonly used for polyurethane reaction. Examples of the catalysts include amine catalysts (tertiary amines such as triethylenediamine and N-ethylmorpholine), tin catalysts (such as stannous octoate and dibutyltin dilaurate), and other metallic catalysts (such as lead octoate). The amount of the catalysts should be about 0.001 to 5% of the amount of the reaction mix.

The process of the present invention may employ other additives, according to need. Examples of such additives include emulsifiers and surface active agents as the foam stabilizer. In this connection, silicone surface active agents (polysiloxane-polyoxyalkylene copolymers) are of great importance.

Further additives that can be used in the present invention include flame retardants, reaction retarders, coloring agents, internal mold releases, age resistors, antioxidants, plasticizers, bacteriocides, carbon black, and fillers.

The process of the present invention for producing polyurethane may be carried out by the conventional one-shot process or prepolymer process (or quasi-prepolymer process), the first being preferable.

The process of the present invention for producing polyurethane is particularly useful for RIM process; but it may also be applied to other processes such as spraying.

The process of the present invention may be put into practice in the usual way, when applied to the production of polyurethane moldings by RIM process. At first, one tank of the high-pressure foaming machine is filled with component-A which is a uniform premix comprising polyols, chain extenders, crosslinkers, catalysts, pigments, foam stabilizers, flame retardants, and optional blowing agents (water and/or "Flon") or air loading, and the other tank is filled with component-B which comprises organic isocyanates. Component-A and component-B are mixed together in the mixing head, with the injection nozzle of the high-pressure foaming machine connected to the inlet of the mold, and the reaction mix is injected into the closed mold. The molded item is demolded after curing.

The process usually consists of the steps of subjecting raw materials (two to four components) preconditioned at 25°-90° C. to impingement mixing under a pressure of 100-200 kg/cm$^2$, injecting the reaction mix into a mold preconditioned at 30°-150° C. (preferably 60°-90° C.), curing for 0.1-5 minutes, and demolding.

As is noted from the above-foregoing, the present invention will greatly improve the productivity of polyurethane molding for automotive bumpers and fascia boards and other exterior and interior parts.

DESCRIPTION OF THE PREFERRED EMBODIMENTS

The invention will be explained with reference to the following examples, in which "parts" means "parts by weight".

The components used in Examples and Comparative Examples are listed below.

(1) Polyols

Polyol I: Trifunctional polyether polyol having a hydroxyl value of 28 which is formed by adding 4,408 parts of PO and then 1,500 parts of EO to 92 parts of glycerin.

Polyol II: Difunctional polyether polyol having a hydroxyl value of 28 which is formed by adding 3,124 parts of PO and then 800 parts of EO to 76 parts of propylene glycol.

Polyol III: Trifunctional polyether polyol having a hydroxyl value of 28 which is formed by adding 4,785 parts of PO and then 1,123 parts of EO to 92 parts of glycerin.

(2) Chain extender

TDA: Diaminotoluene (2,4-diaminotoluene/2,6-diaminotoluene=80/20 by weight)

DETDA: Diethyltolylenediamine (3,5-diethyl-2,4-tolylene diamine/3,5-diethyl-2,6-tolylenediamine=80/20 by weight).

EG: Ethylene glycol.

(3) Polyisocyanate

Isocyanate I: Modified MDI, C-1059, containing 26% of NCO (made by Nippon Polyurethane Co., Ltd.).

(4) Blowing agent

Flon-11 (made by Asahi Glass Co., Ltd.)

(5) Catalysts

DABCO 33LV: Amine catalyst (made by Sankyo Air Products Co., Ltd.).
DBTDL: Dibutyltin dilaurate.

(6) Black toner

Prepared by dispersing carbon black and age resistor (a mixture of UV light absorber, antioxidant, and heat resistance improver) into polyether polyol

(7) External mold release

B-382 (made by Chukyo Yushi Co., Ltd.

Molding conditions

High-pressure foaming machine: MC-232/216 (made by Polyurethane Engineering Co., Ltd.
Delivery: 1800 g/sec.
Delivery pressure: 150–170 kg/cm$^2$.
Injection time: about 2.3 seconds
Temperature of components A and B: about 35° C.
Mold temperature: about 60°–70° C.
Time to demolding: 30 seconds.
Mold: For the molded item (weighing about 4.1 kg) with two openings for lamp mounting and eight openings for air intake.

The moldability was evaluated according to the following criteria:

[1] Sink marks:
A: No sink marks
B: Slight sink marks.
C: Apparent sink marks.

[2] Voids: The resulting molded item was placed in a dryer at 120° C. for 0.5 hours to see if blisters occur due to voids in the surface layer of the molded item. The number of voids is indicated by the number of blisters.

[3] Resistance to mold staining: The mold was coated with the external mold release after washing with dimethylformamide. The surface of the mold was checked for staining after consecutive four molding cycles (without the application of the external mold release).

A: No staining.
B: Slight whitish staining
C: Apparent whitish staining

The molded item was tested for physical properties as follows using a test piece which had been conditioned at 20° C. and 65% RH for more than one week.
Density (g/cm$^3$): JIS K-7112.
Tensile strength (kg/cm$^2$): JIS K-6301.
Elongation (%): JIS K-6301.
Tear strength (kg/cm): JIS K-6301.
Flexural modulus (kg/cm$^2$): JIS K-6301.
Sample: 25×70×3.0 mm.
Span: 40 mm, punch diameter: 5R
Pushing rate: 10 mm/min.

Heat sag (mm)

Sample: 25×125×3.0 mm.
Expressed in terms of the sag distance over which one end of the test piece sagged when the test piece was allowed to stand at 120° C. for 1 hour and cooled at room temperature for 30 minutes, with one end overhung 100 mm.

Volume resistivity ($\Omega \cdot$cm)

The electric current was measured which flowed across a test piece, measuring 100×100×3.0 mm, held between two pieces of aluminum foil, measuring 50×50 mm, to which a voltage of $-30$ kV was applied at 20° C. and 65% RH using a DC high-voltage generator (made by Nichikon Co., Ltd.). The volume resistivity ($\Omega \cdot$cm) was calculated from the measured current according to the formula $R \times S/1$ (where R is resistance ($\Omega$)=applied voltage/current, S is the contact area of the test piece and aluminum foil, and 1 is the thickness of the test piece).

EXAMPLES 1 TO 7 AND COMPARATIVE EXAMPLES 1 TO 5

Polyurethane moldings were prepared in the following manner. At first, one machine tank was charged with component-A comprising polyols, chain extenders, and catalysts according to the formulation shown in Tables 1 and 3 and the other machine tank, with component-B which is isocyanate. Component-A and component-B were mixed together using a high-pressure foaming machine and the reaction mix was injected into a temperature-adjustable closed mold. The resulting polyurethane moldings were examined for moldability and tested for physical properties. The results are shown in Tables 2 and 4.

TABLE 1

|  | Working Example ||||| Comparative Example |||
|---|---|---|---|---|---|---|---|---|
|  | 1 | 2 | 3 | 4 | 5 | 1 | 2 | 3 |
| Polyol I | 50 | 50 | 50 | 50 | 50 | 50 | 50 | 50 |
| Polyol II | 50 | 50 | 50 | 50 | 50 | 50 | 50 | 50 |
| TDA | 0.5 | 0.9 | 1.5 | 2.5 | 3.0 | 0 | 7 | — |
| DE-TDA | — | — | — | — | — | — | — | 7 |
| EG | 16.5 | 16 | 15 | 14 | 14 | 18 | 8 | 8 |
| DABCO 33LV | 1.5 | 1.5 | 1.5 | 1.5 | 1.5 | 1.5 | 1.5 | 1.5 |
| DBTDL | 0.02 | 0.02 | 0.02 | 0.02 | 0.02 | 0.02 | 0.02 | 0.02 |
| Flon-11 | 5 | 5 | 5 | 5 | 5 | 5 | 5 | 5 |
| Isocyanate I (NCO Index) | 105 | 105 | 105 | 105 | 105 | 105 | 105 | 105 |
| TDA/polyol equivalent ratio | 0.16 | 0.30 | 0.47 | 0.82 | 0.98 | 0 | 2.30 | 1.57* |
| TDA + EG/polyol equivalent ratio | 10.8 | 10.6 | 10.1 | 9.9 | 10.0 | 11.6 | 6.8 | 6.7** |

*DE-TDA/polyol equivalent ratio
**DE-TDA + EG/polyol equivalent ratio

TABLE 2

|  | Working Example | | | | | Comparative Example | | |
| --- | --- | --- | --- | --- | --- | --- | --- | --- |
|  | 1 | 2 | 3 | 4 | 5 | 1 | 2 | 3 |
| Molding conditions | | | | | | | | |
| Injection rate | 1800 | 1800 | 1800 | 1800 | 1800 | 1800 | 1800 | 1800 |
| Injection time(s) | 2.3 | 2.3 | 2.3 | 2.3 | 2.3 | 2.3 | 2.3 | 2.3 |
| Gas loading | 15 | 15 | 15 | 20 | 15 | 15 | 23 | 23 |
| Moldability | | | | | | | | |
| Sink mark | A | A | A | A | A~B | A | * | * |
| Voids | 3~4 | 3~4 | 3~4 | 2~3 | 2~3 | 8~10 | * | * |
| Mold staining | A | A | A | A | A | C | * | * |
| Physical properties | | | | | | | | |
| Density | 1.01 | 1.00 | 1.01 | 1.02 | 1.00 | 1.03 | 1.05 | — |
| 50% modulus | 104 | 105 | 100 | 107 | 108 | 98 | 100 | — |
| Tensile strength | 203 | 204 | 203 | 205 | 206 | 205 | 210 | |
| Elongation | 200 | 203 | 201 | 235 | 230 | 200 | 240 | — |
| Flexural modulus | 2200 | 2150 | 2100 | 1920 | 2050 | 1980 | 1940 | — |
| Tear strength | 78 | 80 | 81 | 75 | 78 | 79 | 78 | — |
| Heat sag | 27.9 | 28.1 | 28.8 | 23.5 | 22.5 | 27.5 | 22.0 | |
| Volume resistivity ($\times 10^{12}$) | 1.9 | 2.6 | 2.8 | 3.4 | 4.0 | 1.6 | 16 | — |

*Molding was impossible due to incomplete filling.

TABLE 3

|  | Example | | Comparative Example | |
| --- | --- | --- | --- | --- |
|  | 6 | 7 | 4 | 5 |
| Polyol II | 45 | 45 | 45 | 45 |
| Polyol III | 45 | 45 | 45 | 45 |
| Black toner | 10 | 10 | 10 | 10 |
| TDA | 1 | 1 | 1 | 1 |
| EG | 16 | 16 | 13 | 23 |
| DABCO 33LV | 1.5 | 1.5 | 1.5 | 1.5 |
| DBTDL | 0.02 | 0.02 | 0.02 | 0.02 |
| Flon-11 | 5 | — | 5 | 5 |
| Isocyanate I (NCO Index) | 105 | 105 | 105 | 105 |
| TDA/polyol equivalent ratio | 0.33 | 0.33 | 0.33 | 0.33 |
| TDA + EG/polyol equivalent ratio | 10.7 | 10.7 | 6.8 | 15.2 |

TABLE 4

|  | Example | | Comparative Example | |
| --- | --- | --- | --- | --- |
|  | 6 | 7 | 4 | 5 |
| Molding conditions | | | | |
| Injection rate | 1600 | 1600 | 1600 | 1600 |
| Injection time(s) | 2.6 | 2.6 | 2.6 | 2.6 |
| Gas loading | 15 | 20 | 15 | 15 |
| Moldability | | | | |
| Sink mark | A | A | A | A |
| Voids | 3~4 | 2~3 | 3~4 | 5~6 |
| Mold staining | A | A | A | C |
| Physical properties | | | | |
| Density | 1.04 | 1.03 | 1.04 | 1.03 |
| 50% modulus | 106 | 107 | 84 | 230 |
| Tensile strength | 203 | 200 | 183 | 256 |
| Elongation | 200 | 201 | 250 | 153 |
| Flexural modulus | 2100 | 2000 | 1300 | 6300 |
| Tear strength | 82 | 80 | 58 | 103 |
| Heat sag | 27.9 | 28.1 | 43.0 | 18.5 |
| Volume resistivity ($\times 10^{12}$) | 3.6 | 3.5 | 1.9 | 8.5 |

As this invention may be embodied in several forms without departing from the spirit of essential characteristics thereof, the present embodiment is therefore illustrative and not restrictive. The scope of the invention is defined by the appended claims, and all changes that fall within meets and bounds of the claims, or equivalence of such meets and bounds are embraced by the claims.

We claim:

1. A process for producing polyurethane by reacting an organic polyisocyanate, high-molecular weight polyol, and low-molecular weight, active hydrogen-containing compound with one another in the presence of catalysts and, if necessary, blowing agents/ foam stabilizers, and other adjuvants, said process comprising using a terminal 7-30 weight % of polyoxyethylene chain-containing polyether polyol having 2-4 hydroxyl groups and a hydroxyl equivalent higher than 750 [component (a)] as the high-molecular weight polyol, diaminotoluene [component (b)] and a low-molecular weight polyol having a hydroxyl equivalent of 30-100 [component (c),] as the low-molecular weight, active hydrogen-containing compound-, with the equivalent ratio of component (c) to component (a) being 8-12 and the equivalent ratio of component (b) to component (a) being 0.15-1.0.

2. A process set forth in claim 1, wherein the equivalent ratio of the low-molecular weight, active hydrogen-containing compound to the high-molecular weight polyol is 8 to 13, preferably 9 to 12.

3. A process set forth in claim 1 or 2, wherein the NCO equivalent of the organic polyisocyanate is 130 to 200.

4. A process set forth in claim 1, wherein the hydroxyl equivalent of the polyether polyol [component (a)] is 1,500 to 3,000.

5. A process set forth in claim 1, wherein the hydroxyl equivalent of the low-molecular weight polyol [component (c)] is 30 to 50.

6. A process set forth in claim 1, wherein the equivalent ratio of the diaminotoluene [component (b)] to the polyether polyol [component (a)] is 0.2 to 0.8, preferably 0.25 to 0.7.

7. A process set forth in claim 1 or 4, wherein the content of polyoxyethylene chains in the polyether polyol [component (a)] is 5% and above, preferably 7 to 50%, and more preferably 10-40%.

8. A process set forth in any of claims 1 to 7, wherein the blowing agent is water, a volatile blowing agent, and/or a gas admitted by force and the resulting polyurethane has a density of 0.3 g/cm$^3$ and above.

9. A process set forth in any of claims 1 to 8, wherein polyurethane moldings are formed by reaction injection molding process.

10. Polyurethane produced by the process set forth in any of claims 1 to 9.

* * * * *